United States Patent
Davidson, Jr. et al.

(10) Patent No.: US 9,379,502 B2
(45) Date of Patent: Jun. 28, 2016

(54) TOOL-LESS BUSWAY TAKE-OFF DEVICE FOR ELECTRICAL BUSWAY AND METHOD OF INSTALLING

(71) Applicant: UNIVERSAL ELECTRIC CORPORATION, Canonsburg, PA (US)

(72) Inventors: Thomas J. Davidson, Jr., Canonsburg, PA (US); Jay W. Lewis, Jr., Bridgeville, PA (US)

(73) Assignee: UNIVERSAL ELECTRIC CORPORATION, Canonsburg, PA (US)

( * ) Notice: Subject to any disclaimer, the term of this patent is extended or adjusted under 35 U.S.C. 154(b) by 0 days.

(21) Appl. No.: 14/621,737

(22) Filed: Feb. 13, 2015

(65) Prior Publication Data
US 2015/0236462 A1  Aug. 20, 2015

Related U.S. Application Data

(60) Provisional application No. 61/939,822, filed on Feb. 14, 2014.

(51) Int. Cl.
*H01R 25/14*     (2006.01)

(52) U.S. Cl.
CPC .................................... *H01R 25/142* (2013.01)

(58) Field of Classification Search
CPC .............................. H01R 25/14; H01R 25/142
See application file for complete search history.

(56) References Cited

U.S. PATENT DOCUMENTS

| | | | | |
|---|---|---|---|---|
| 3,686,614 A | * | 8/1972 | Hyrylainen | H01R 25/142 439/122 |
| 3,813,633 A | * | 5/1974 | Clement | H01R 25/142 439/118 |
| 4,032,208 A | | 6/1977 | Berkenhoff | |
| 4,163,595 A | * | 8/1979 | Vasseur | H01R 25/142 439/121 |
| 4,493,519 A | * | 1/1985 | Olsen | H01R 25/142 439/212 |
| 4,790,766 A | * | 12/1988 | Booty, Sr. | H01R 25/142 439/117 |
| 5,128,847 A | * | 7/1992 | Lin | F21V 23/02 362/147 |
| 5,702,177 A | * | 12/1997 | Lin | F21S 8/038 362/370 |
| 6,079,992 A | * | 6/2000 | Kuchar | F21V 21/35 362/287 |
| 8,899,999 B2 | * | 12/2014 | Mackiewicz | F21S 8/038 439/118 |
| 2015/0024615 A1 | * | 1/2015 | Lindblom | H01R 13/625 439/121 |

FOREIGN PATENT DOCUMENTS

| | | |
|---|---|---|
| DE | 22 50 738 A1 | 4/1974 |
| DE | 20 2012 100629 U1 | 5/2013 |
| WO | 94/24731 A1 | 10/1994 |
| WO | 97/34352 A1 | 9/1997 |

OTHER PUBLICATIONS

European Patent Office, "extended European search report for EP 15 15 5083", Jun. 26, 2015, 6 pp.

* cited by examiner

*Primary Examiner* — Gary Paumen
(74) *Attorney, Agent, or Firm* — Eckert Seamans Cherin & Mellott, LLC; Stephen A. Bucchianeri

(57) ABSTRACT

A take-off device for use with an electrical busway includes a housing having a number of electrical components disposed therein; a number of stabs electrically coupled to the electrical components, each stab of the number of stabs being structured to engage a busbar of an electrical busway; and a securement mechanism moveably coupled to the housing and structured to tightly secure the take-off device to the electrical busway without the use of any tools.

20 Claims, 11 Drawing Sheets

TOOL-LESS BUSWAY TAKE-OFF DEVICE FOR ELECTRICAL BUSWAY AND METHOD OF INSTALLING

CLAIM TO PRIORITY

This patent application claims the priority benefit under 35 U.S.C. §119(e) of U.S. Provisional Application No. 61/939, 822 filed on Feb. 14, 2014, and entitled, "Tool-less Take-Off Device Installation", the contents of which are hereby incorporated herein by reference.

FIELD OF THE INVENTION

The present concept generally relates to electrical busways, and more particularly, to take-off devices for use with electrical busways which can be installed or uninstalled without the need for any tools. The present concept also relates to methods for installing and uninstalling such take-off devices.

DESCRIPTION OF THE RELATED ART

It is common in factories, shops, offices and other buildings to install overhead electrical power distribution tracks for providing a convenient source of electricity for lights, machines and other electrical devices in the buildings. Electrical power distribution tracks are typically comprised of an elongated housing containing multiple electrically-isolated, conductive busbars. Track lighting and continuous plug-in busways are typical of this type of track system. Sections of the track can be joined together to form long runs for power distribution.

Take-off Devices are used to tap power from the track or busway to the load apparatus. The load may be anything from a lamp to a three phase electrical machine. It is desirable to be able to insert take-off devices into, or remove them from, the track at any point along the track itself and make a secure electrical contact with the busbars. Such systems are defined as 'continuous plug-in busway'. It is also desirable that the electrical connection between take-off devices and the busbar not require bolts, crimps or other fastening hardware. A pressure connection is easily made or removed and is therefore the method of choice for most busbars to take-off device connections.

FIGS. 1 and 2, respectively, show isometric and end views of a portion of an example of a section of continuous busway 10 as known in the art. Busway 10 includes a housing 12 having a number of conductive busbars 14 coupled thereto. By being "continuous", busway 10 allows for a take-off device 16, such as shown in FIG. 3, to be placed anywhere along the length thereof, such as shown in FIGS. 4 and 5. Take-off device 16 includes a number of stab members 18 which each engage a corresponding one of the conductive busbars 14 when the take-off device 16 is secured to the busway 10 as shown in FIG. 4.

While the elimination of bolts, crimps, or other fasting hardware has been successfully achieved at the electrical connection between stabs 18 of the take-off device 16 and the busbars 14, the take-off device 16 must also be properly secured to the busway 10 to ensure that any vibrations, external forces, or load apparatuses do not cause the take-off device 10 to lose connection with the busbars 14 and/or the busway 10. Traditionally, this has been achieved by utilizing fasteners, clamps, and/or a multi-component assembly 20, such as shown in the example conventional devices shown in FIGS. 3-5. Such additional hardware adds to the cost of the take-off device and requires particular tooling when installing or removing the take-off device. Such hardware and tooling requires significant time when installing or removing the take-off device.

Accordingly, a need exists for an improved take-off device that can be secured and unsecured from an electrical busway without the need for tools.

SUMMARY

These needs and others are met by embodiments of the present concept which, as a first aspect, provide a take-off device comprising: a housing having a number of electrical components disposed therein; a number of stabs electrically coupled to the electrical components, each stab of the number of stabs being structured to engage a busbar of an electrical busway; and a securement mechanism moveably coupled to the housing and structured to tightly secure the take-off device to the electrical busway without the use of any tools.

The securement mechanism may be moveable from a first position to a second position, and when disposed in the second position may be structured to secure the take-off device to an electrical busway.

The number of stabs may be disposed at or about a first end of the housing and the securement mechanism may be disposed at or about an opposite second end of the housing.

The securement mechanism may comprise a first member moveably coupled to the housing and structured to selectively engage a portion of an electrical busway.

The first member may comprise a lever member disposed on an outer portion of the housing and rotatably coupled thereto such that the lever member is rotatable with respect to the housing about a first axis.

The first member may further include a first arcuate member disposed on an inner portion of the housing which is rigidly coupled to the lever member in a manner such that the first arcuate member is rotatable with respect to the housing along with the lever member about the first axis.

The first arcuate member may include a toothed portion disposed facing outward from the first axis.

The lever member and the first arcuate member may be aligned such that when the lever member is disposed in a generally vertical position extending downward from the first axis, the first arcuate member is generally retracted into the housing.

The securement mechanism may further comprise a second member moveably coupled to the housing and structured to selectively engage another portion of the electrical busway.

The second member may comprise a second arcuate member disposed on an inner portion of the housing and which is rotatable with respect to the housing about a second axis which is disposed generally parallel to the first axis.

The securement mechanism may further comprise a second arcuate member disposed on an inner portion of the housing and which is rotatable with respect to the housing about a second axis which is disposed generally parallel to the first axis, wherein the second arcuate member includes a second toothed portion disposed facing outward from the second axis, and wherein each of the first and second arcuate members are sized and positioned such that the first toothed portion and the second toothed portion cooperatively mesh such that rotation of the first arcuate member about the first axis in a first direction causes the second arcuate member to rotate about the second axis in a second direction opposite the first direction.

The securement mechanism may further include a latch member rotatably coupled to the outside of housing such that latch member is rotatable about a third axis disposed generally parallel to the first axis and the second axis.

The lever member may be moveable from a first position to a second position, wherein: when the lever member is disposed in the first position each of the first arcuate member and the second arcuate member is disposed generally within the housing in a corresponding first position, and wherein the lever member is disposed in the second position, each of the first arcuate member and the second arcuate member is disposed generally extended from the housing in a corresponding second position; and wherein when the lever member is disposed in the second position, the latch member is moveable from a first position in which the latch mechanism is not engaged with the lever member to a second position in which the latch member is engaged with the lever member and generally prevents movement of the lever member from its second position.

As another aspect of the present concept, a method for securing a take-off device to an electrical busway having a housing and a number of busbars disposed therein is provided. The method comprises: aligning a housing of the take-off device with the housing of the busway, the housing of the take-off device including a securement mechanism coupled thereto; and moving the securement mechanism from a first position in which the securement mechanism is not engaged with the housing of the busway to a second position in which the securement mechanism is engaged with, and securely couples the housing of the take-off device to the housing of the busway.

The method may further comprise moving a latch member associated with the securement mechanism from a first position to a second position in which the latch member effectively locks the securement mechanism in the second position.

Aligning the housing of the take-off device with the housing of the busway may comprise: engaging a portion of the take-off device with the housing of the busway; and rotating the take-off device with respect to the housing of the busway.

DETAILED DESCRIPTION OF AN EXEMPLARY EMBODIMENT

Figure 1:
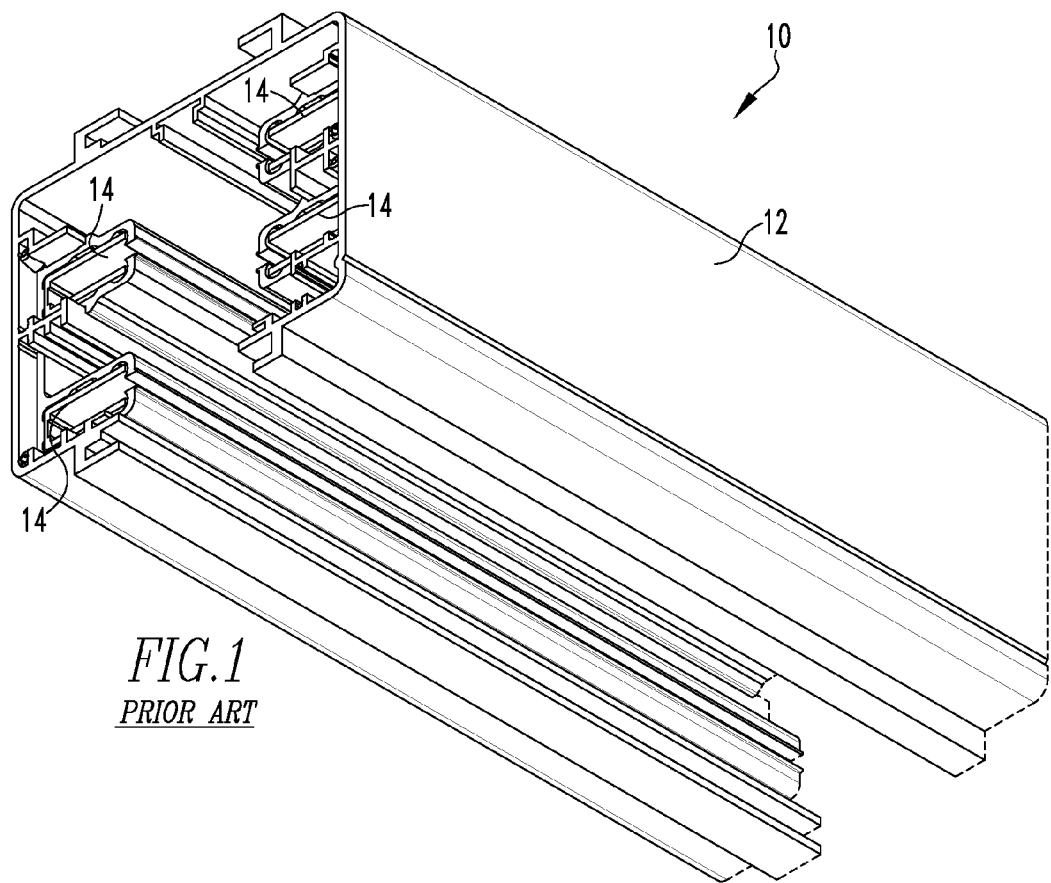
FIG. 1 is an isometric view of a portion of a conventional electrical busway.

Directional phrases used herein, such as, for example, left, right, clockwise, counterclockwise, top, bottom, up, down, and derivatives thereof, relate to the orientation of the elements shown in the drawings and are not limiting upon the claims unless expressly recited therein.

As employed herein, the term "number" shall mean one or an integer greater than one (i.e., a plurality) and the singular form of "a", "an", and "the" include plural referents unless the context clearly indicates otherwise.

As employed herein, the phrase "rigidly coupled" shall be used to describe two or more components which are coupled in a manner such that none of the components can move without the other of the components.

As employed herein, the phrase "moveably coupled" shall be used to describe two or more components which are coupled together in a manner such that the components are capable of moving with respect to each other in some manner (e.g., sliding, rotating, etc.).

As employed herein, the phrase "rotatably coupled" shall be used to describe two or more components which are coupled together in a manner such that the movement of the components with respect to each other is limited to rotating.

Embodiments of the present concept aim to eliminate the need for additional mounting hardware and tooling associated with conventional take-off devices. Embodiments of the present concept also seek to significantly reduce the time required to install each take-off device. This intent is achieved by creating an internal securement mechanism that uses resistive and opposing forces (such as gravity and the weight of load apparatuses) to lock components into place and restrict motion of the take-off device until intentionally released. In addition, by utilizing a system of bi-directional rotating components, a tool-free installation procedure is provided that is not only safer, but quicker and easier to install as opposed to conventional arrangements.

Figure 2:
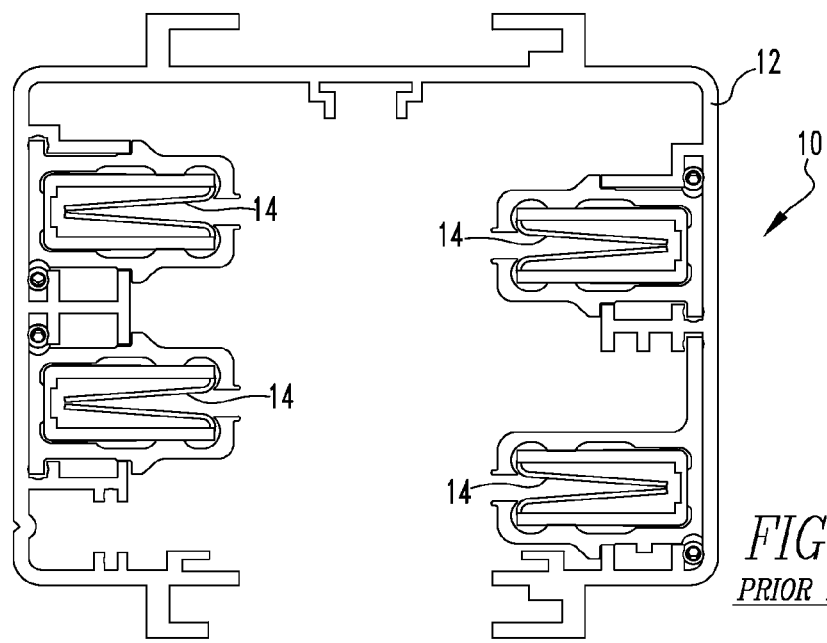
FIG. 2 is an elevation view of an end of the portion of electrical busway of FIG. 1.
Figure 3:
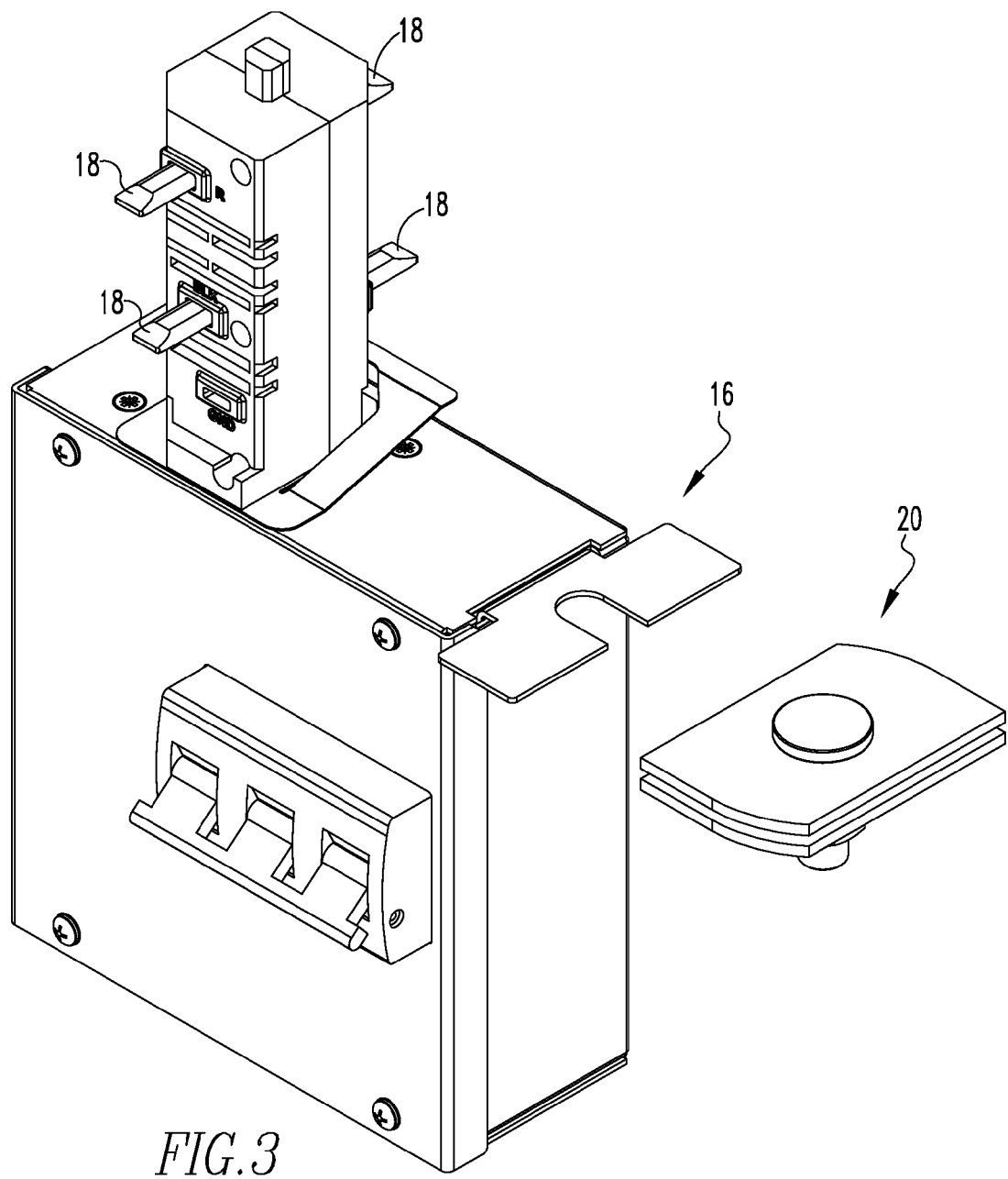
FIG. 3 is an isometric view of a conventional take-off device.
Figure 4:
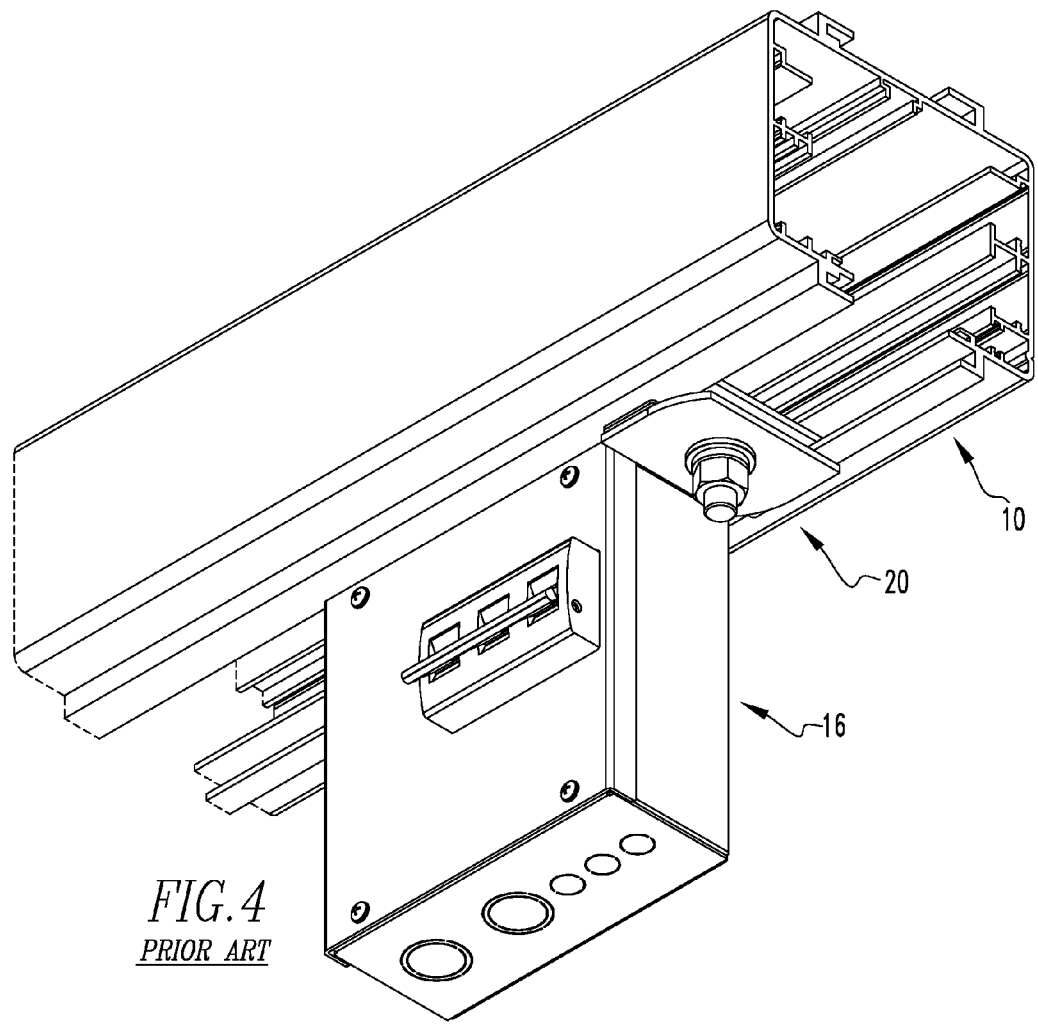
FIG. 4 is an isometric view of the take-off device of FIG. 3 installed on the section of electrical busway of FIGS. 1 and 2.
Figure 5:
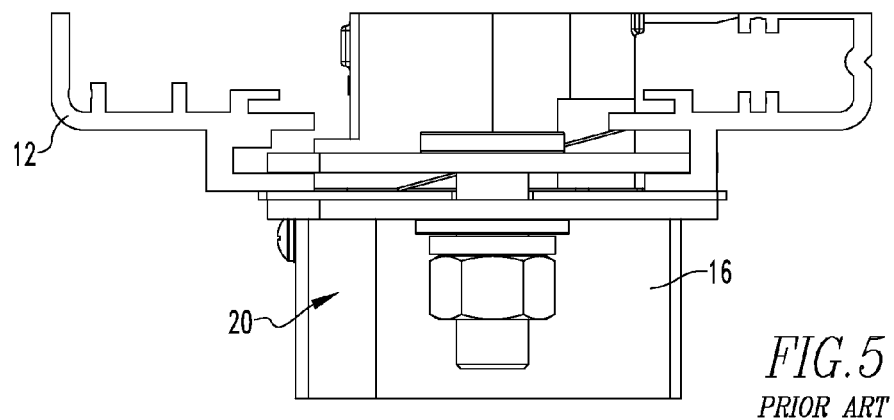
FIG. 5 is an elevation view of a portion of the end of the electrical busway and take-off device of FIG. 4.
Figure 6A:
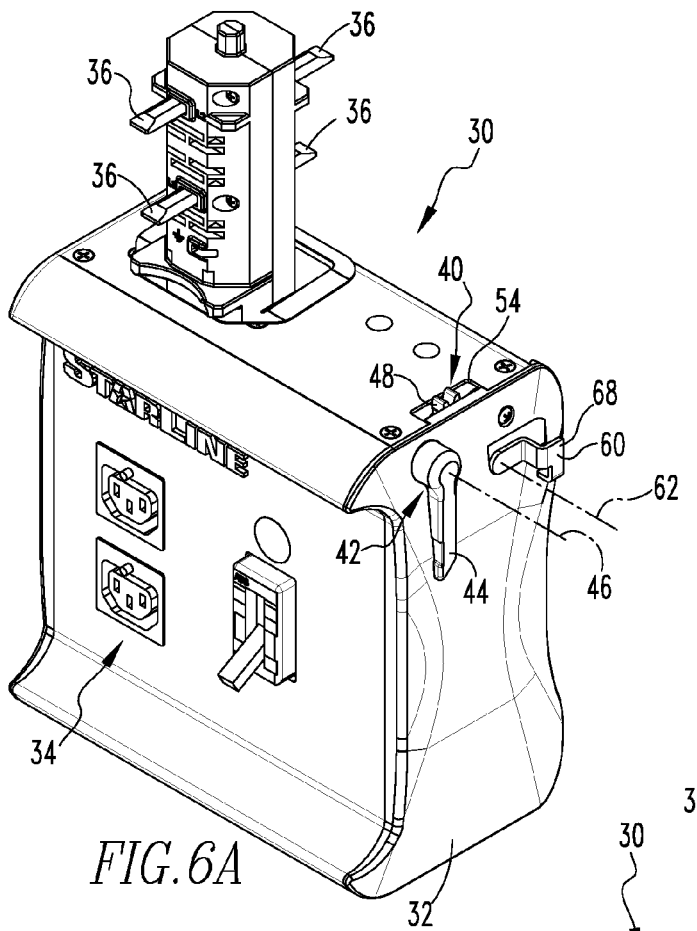
FIGS. 6A and 6B, respectively, are front and rear isometric views of a take-off device in accordance with an example embodiment of the present concept shown with a securement mechanism positioned in a first position.
Figure 6B:
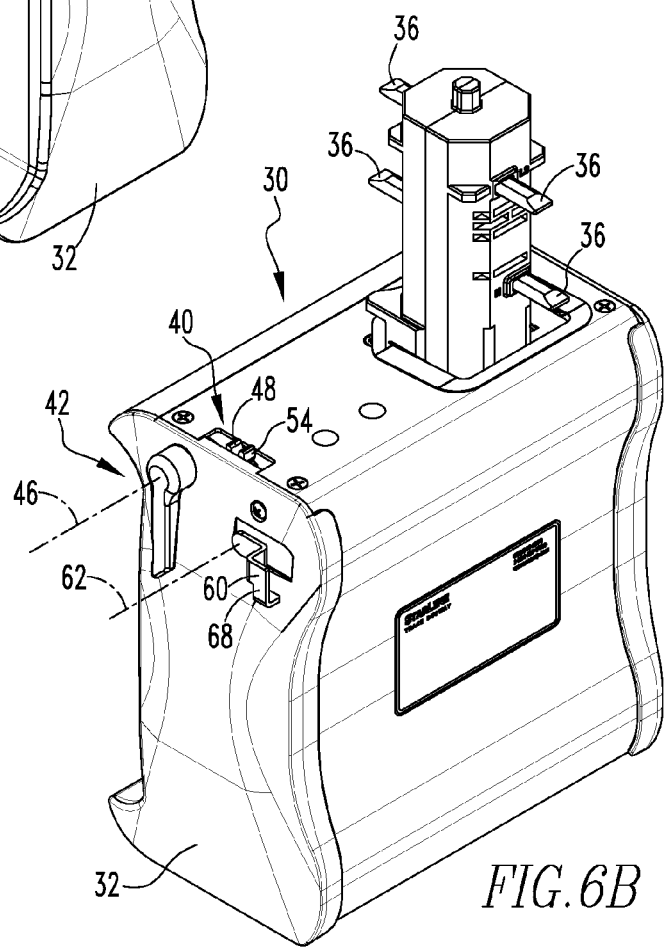
Figure 7A:
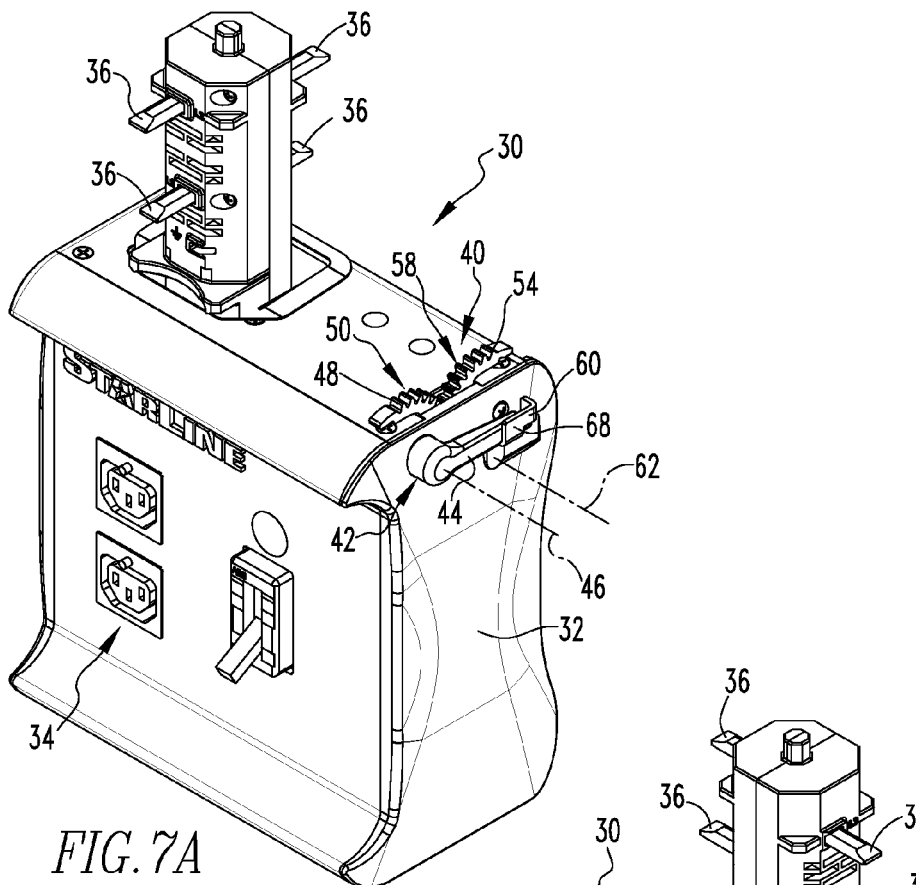
FIGS. 7A and 7B, respectively, are front and rear isometric views of a take-off device in accordance with an example embodiment of the present concept shown with a securement mechanism positioned in a second position.
Figure 7B:
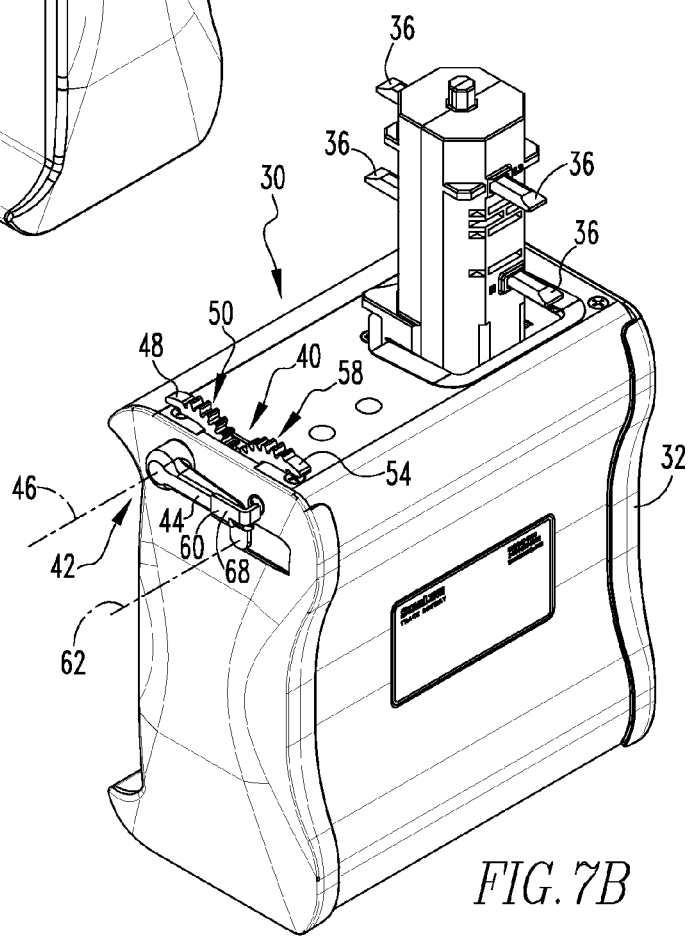

Referring to FIGS. 6A and 6B, respectively, front and rear isometric views of a take-off device 30 in accordance with an example embodiment of the present concept are shown. Similar to conventional take-off devices (e.g., without limitation, take-off device 16 shown in FIG. 3), take-off device 30 includes a housing 32 having a number of electrical components, shown generally at 34, housed therein (e.g., without limitation, switches, receptacles, fuses, etc.) and a number of stabs 36 which are electrically coupled to the electrical components 34 in a suitable manner and are each adapted to engage an electrical busbar of a busway (e.g., without limitation, busway 10 of FIGS. 1 and 2) when take-off device 30 is installed on a section of busway. Take-off device 30 further includes a securement mechanism 40 coupled at or about an end (not numbered) of housing 32 that is selectively moveable to secure and unsecure take-off device 30 from a section of busway without the use of any tools (as will be discussed in further detail below). As will be appreciated from the discussion below, securement mechanism 40 is a part of take-off device 30 that is carried therewith and thus not a separate securement mechanism (e.g., in contrast to assembly 20 of FIG. 3).

Figure 8:
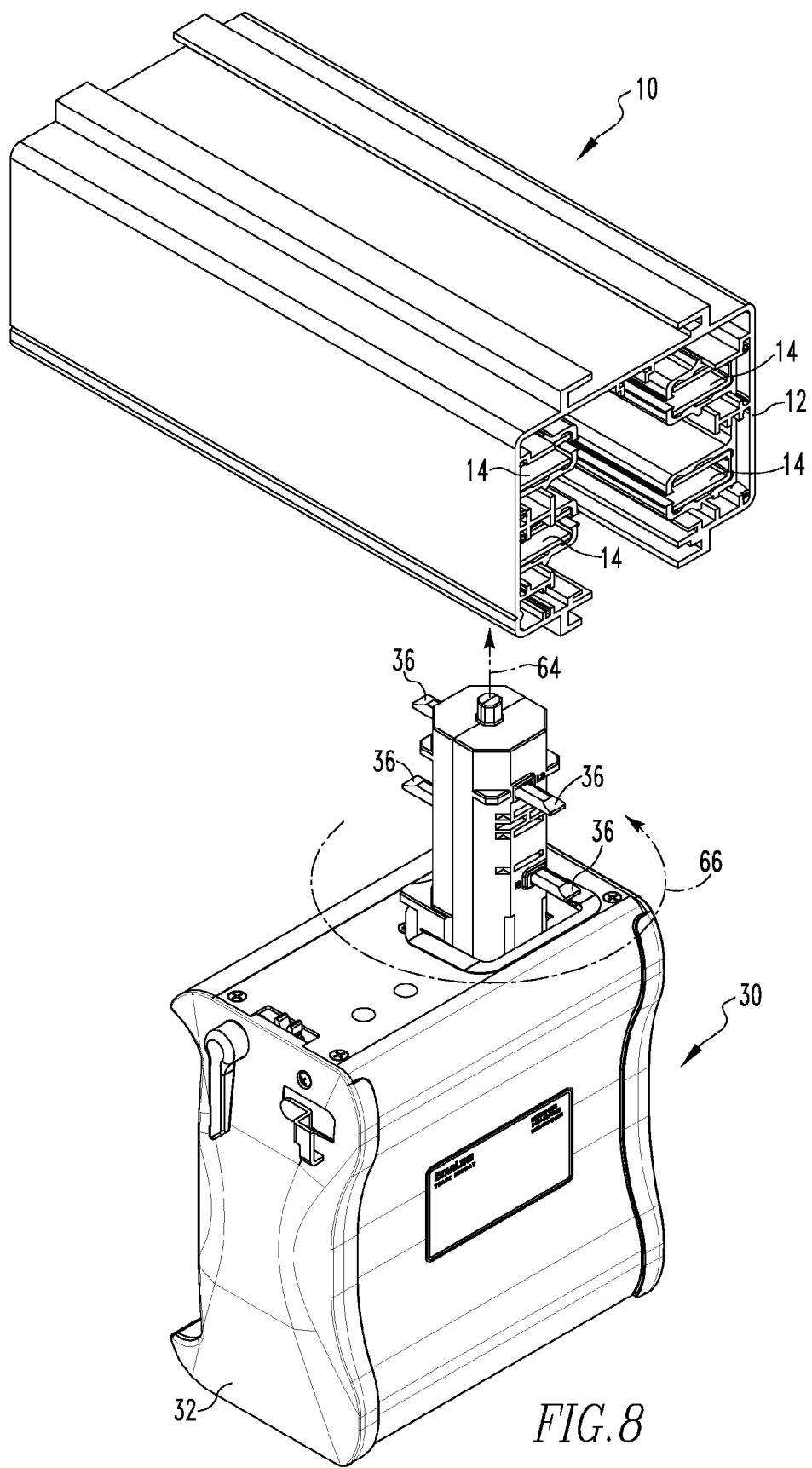
FIG. 8 is an exploded view of the take-off device of FIGS. 6A and 6B shown in an insertion position with respect to a section of busway.
Figure 9A:
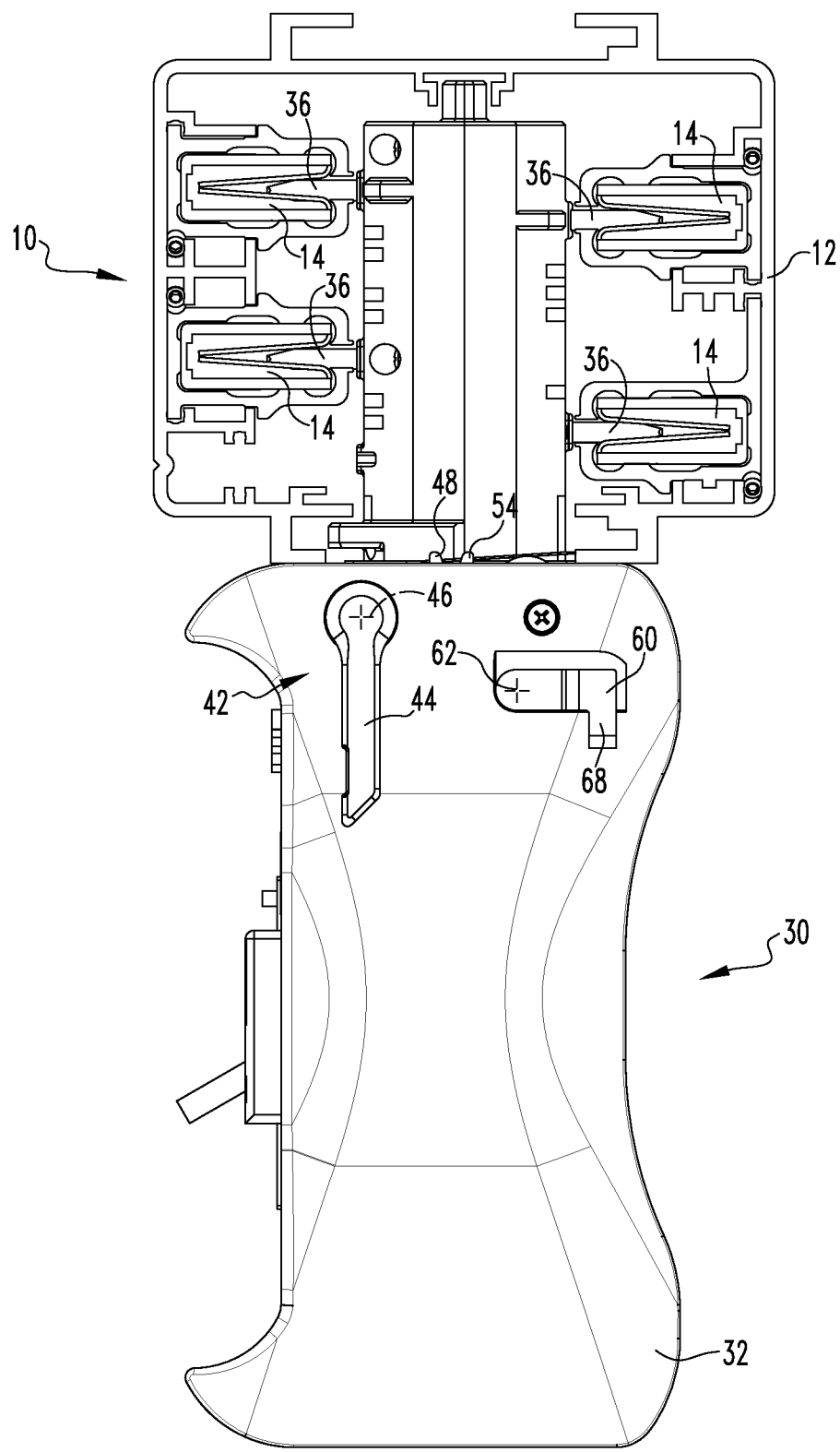
FIG. 9A is an end view of the take-off device of FIGS. 6A and 6B engaged with the busbars of a busway with the retention mechanism shown in a first, unsecured position.
Figure 9B:
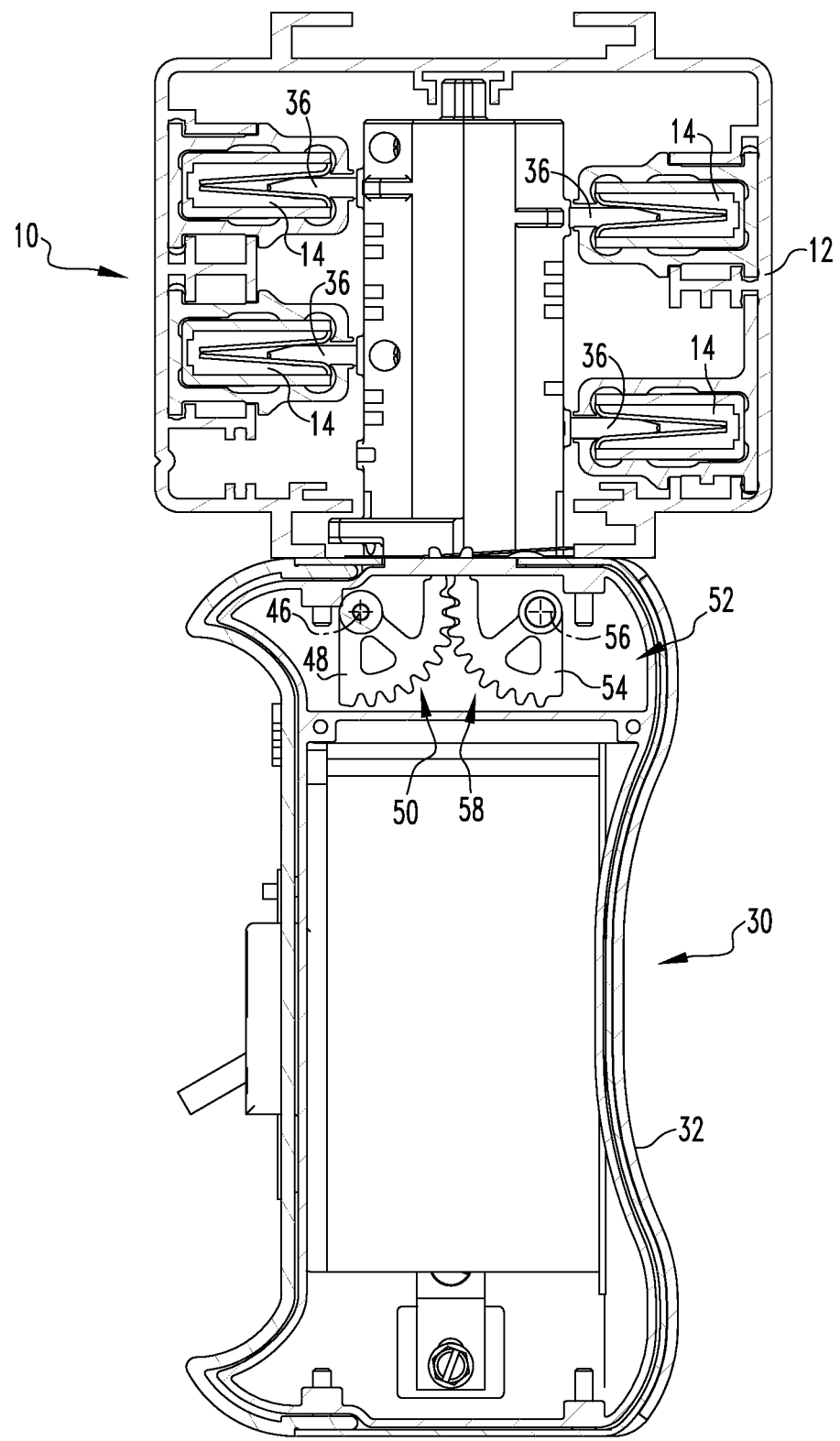
FIG. 9B is a sectional view similar to that of FIG. 9A of the take-off device of FIGS. 6A and 6B engaged with the busbars of a busway with the retention mechanism shown in a first, unsecured position taken a short distance into the view of FIG. 9A.
Figure 10A:
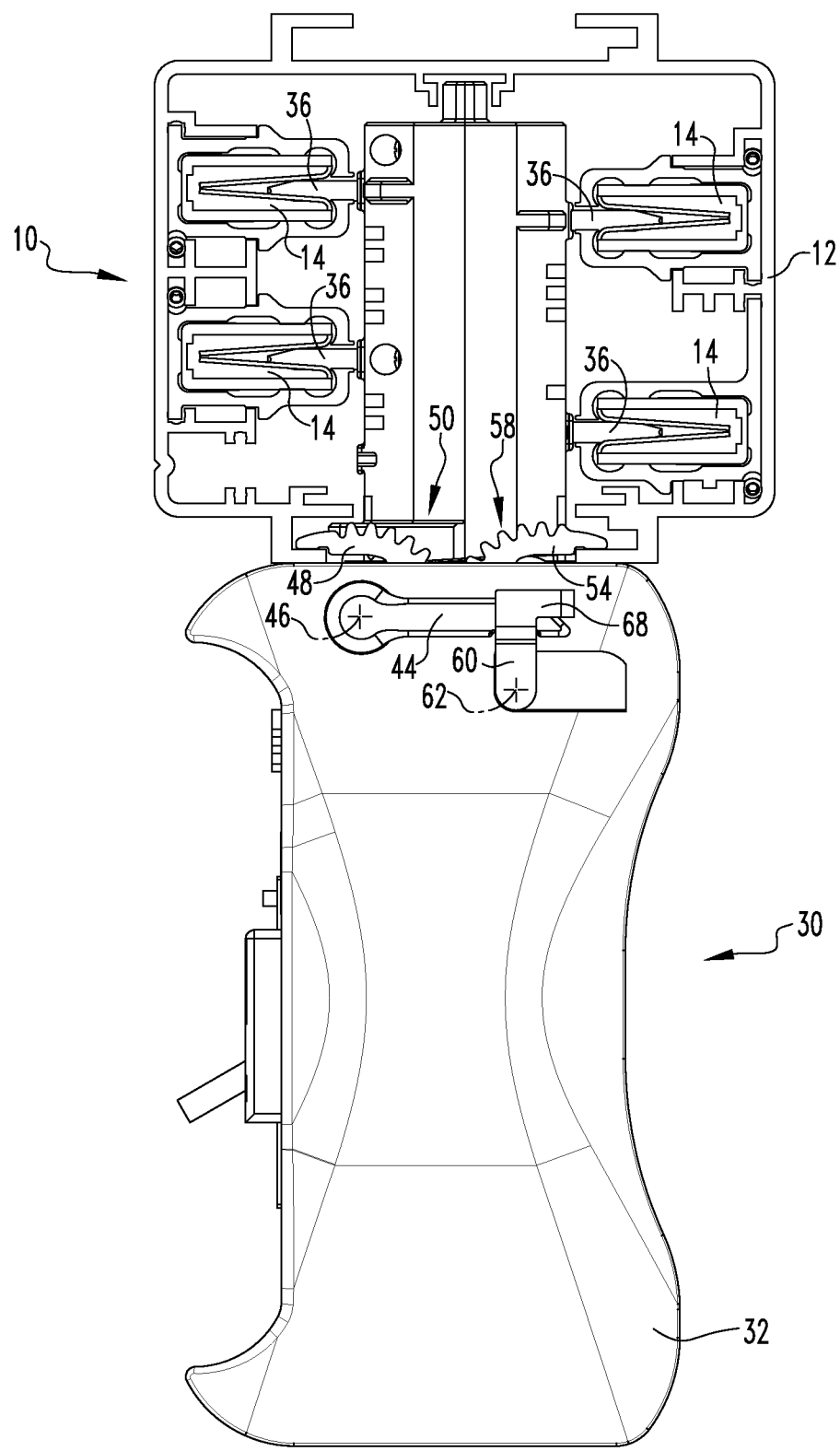
FIG. 10A is an end view, similar to the view of FIG. 9A, except showing the retention mechanism disposed in a second, secure position.
Figure 10B:
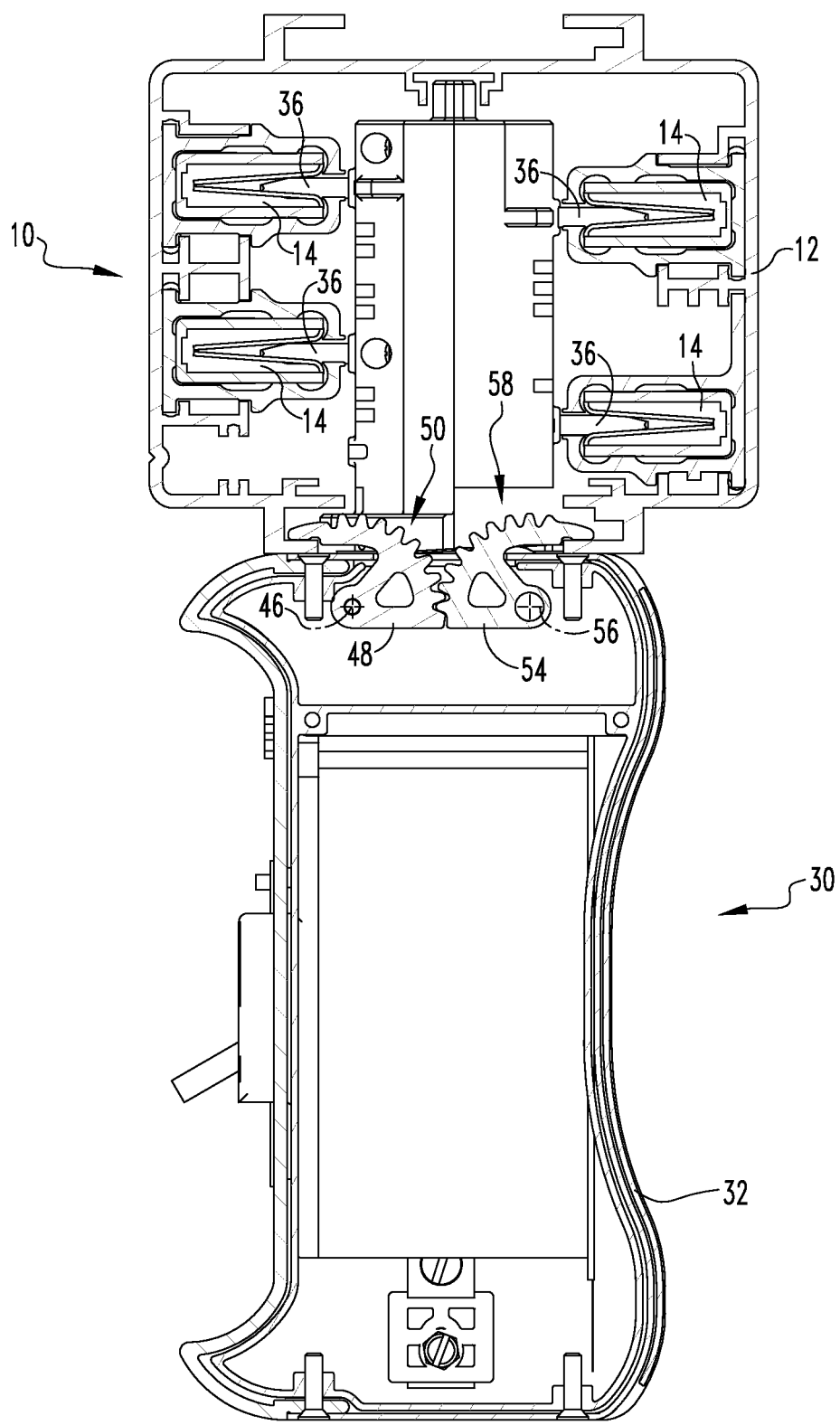
FIG. 10B is a sectional view, such as indicated by line B-B of FIG. 11, similar to that of FIG. 9B except showing the retention mechanism disposed in a second, secure position.
Figure 11:
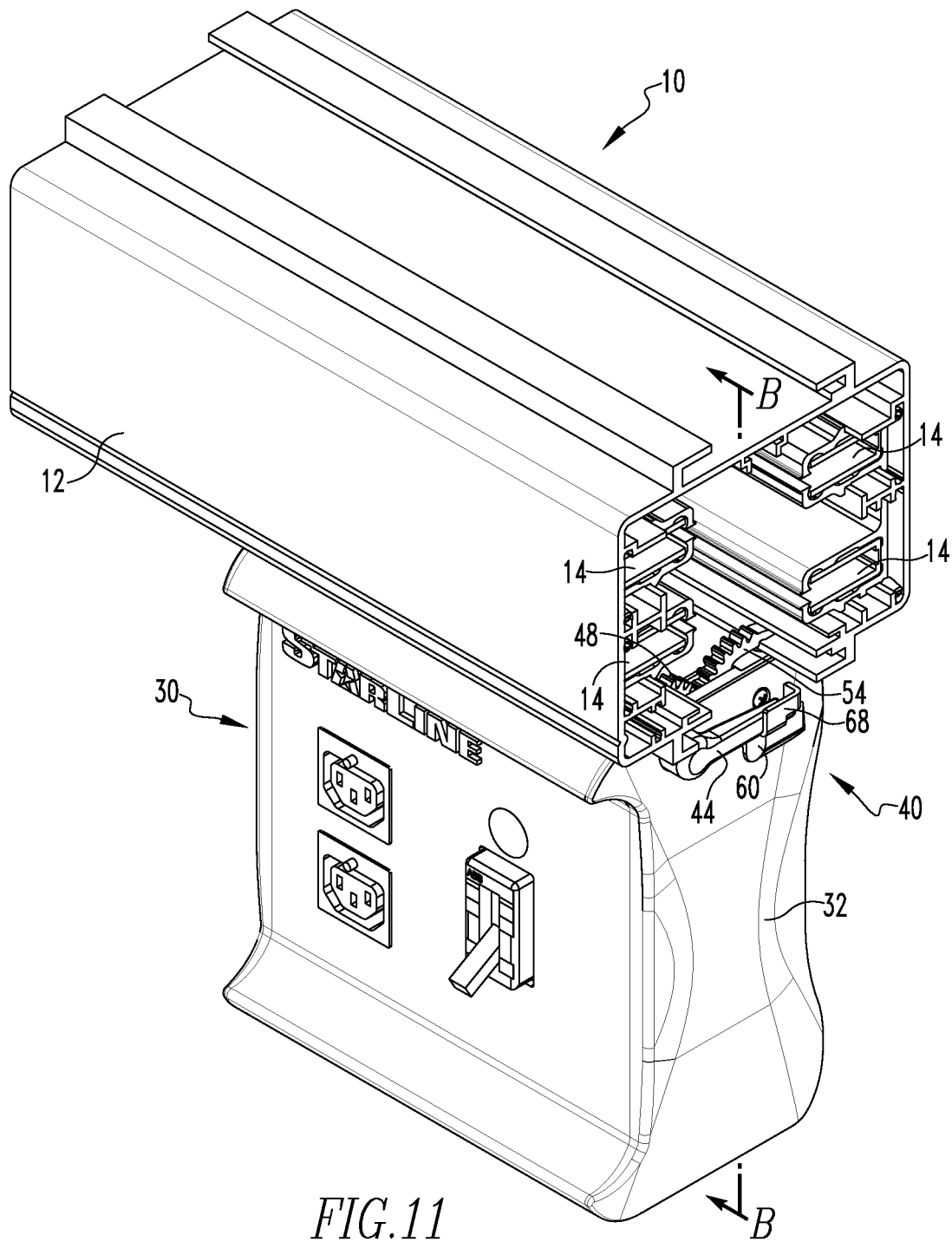
FIG. 11 is an isometric view of the arrangement shown in FIGS. 10A and 10B showing the take-off device of FIGS. 6A and 6B installed and secured to a section of busway.

Referring now to FIGS. 6A, 6B, 7A, 7B, 9A, 9B, 10A and 10B, securement mechanism 40 includes a first member 42 moveably coupled to housing 32. In the example illustrated embodiment, first member 42 includes a lever member 44 disposed on an outer portion of housing 32 and which is rotatable with respect to (i.e., rotatably coupled to) the housing 32 about a first axis 46. First member 42 further includes a first arcuate member 48, best shown in FIGS. 9B and 10B, disposed on an inner portion of housing 32 and rigidly coupled to the lever member 44 in a manner such that first arcuate member 48 is rotatable with respect to housing 32 along with lever member 44 about first axis 46. Referring to FIGS. 9B and 10B, first arcuate member 48 includes a toothed portion 50 disposed facing outward from first axis 46. As shown in the corresponding views of FIGS. 9A and 9B, lever member 44 and first arcuate member 48 are aligned such that when lever member 44 is disposed in a first, generally vertical position, in which lever member 44 extends downward from first axis 46 (such as shown in FIGS. 6A, 6B, 8, 9A), first arcuate member 48 is disposed in a corresponding first position in which first arcuate member 48 is generally retracted into housing 32 of take-off device 30 (such as shown in FIGS. 6A, 6B, 9A and 9B). Similarly, when lever member 44 is disposed in a second, generally horizontal position, in which lever member 44 extends horizontally from first axis 46 (such as shown in FIGS. 7A, 7B, 10A and 11), first arcuate member 48 is disposed in a corresponding second position in which first arcuate member 48 is generally extended outward from housing 32 of take-off device 30 (such as shown in FIGS. 7A, 7B, 10, 10B and 11).

Continuing to refer to FIGS. 6A, 6B, 7A, 7B, 9A and 10A, and particularly to FIGS. 9B and 10B, securement mechanism 40 further includes a second member 52 moveably coupled to housing 32. In the example illustrated embodiment, second member 52 is formed as a second arcuate member 54 disposed on an inner portion of housing 32 and which is rotatable with respect to (i.e., rotatably coupled to) the housing 32 about a second axis 56 which is disposed generally parallel to first axis 46. Similar to first arcuate member 48, second arcuate member 54 also includes a toothed portion 58 disposed facing outward from second axis 56. As shown in the sectional views of FIGS. 9B and 10B, each of the first and second arcuate members 48, 54 are sized and positioned such that toothed portions 50, 58 thereof cooperatively mesh (e.g., like portions of two gears) such that rotation of one of the arcuate members 48, 54 about its corresponding axis 46, 56 in a particular direction results in an equivalent rotation of the other arcuate member in the opposite direction about its corresponding axis. Second arcuate member 54 is aligned with first arcuate member 48 such that, via interaction of toothed portions 50 and 58, when first arcuate member 48 is disposed in the previously described first position (i.e., when lever member 44 is disposed in the first, generally vertical position, in which lever member 44 extends downward from first axis 46, such as shown in FIGS. 6A, 6B, 8, 9A), second arcuate member 54 is disposed in a corresponding first position in which second arcuate member 54 (similar to first arcuate member 48) is generally retracted into housing 32 of take-off device 30 (such as shown in FIGS. 6A, 6B, 9A and 9B). Similarly, when second arcuate member 48 is disposed in the previously described second position (i.e., when lever member 44 is disposed in the second, generally horizontal position, in which lever member 44 extends horizontally from first axis 46, such as shown in FIGS. 7A, 7B, 10A and 11), second arcuate member 54 is disposed in a corresponding second position in which second arcuate member 54 (similar to first arcuate member 48) is generally extended outward from housing 32 of take-off device 30 (such as shown in FIGS. 7A, 7B, 10, 10B and 11).

Referring now to FIGS. 6A, 6B, 7A, 7B, 9A, 10A and 11, securement mechanism 40 further includes a latch member 60 rotatably coupled to the outside of housing 32 such that latch member 60 is rotatable about a third axis 62 disposed generally parallel to first axis 46 and second axis 56. As will be discussed further below, latch member 60 includes a seat portion 68 which is structured to engage a portion of lever member 44.

Having thus described the basic components of take-off device 30, installation and removal thereof from an example busway will now be described in conjunction with FIGS. 6A, 6B, 8, 9A, 9B, 10A, 10B and 11. Prior to install, lever member 44 is positioned in the previously described first position such as shown in FIGS. 6A and 6B wherein the lever member 44 is disposed in a generally vertical position, extending downward from the first axis 46. When lever member 44 is disposed in such position, each of the first arcuate member 48 and the second arcuate member 54 are generally retracted into housing 32. Next, as shown in FIG. 8, take-off device 30 is positioned such that the number of stabs 36 are disposed generally parallel to the busway 10, and thus the housing 32 is disposed generally perpendicular to the busway 10. Next, take off device is moved toward busway 10, in a direction as generally shown by arrow 64 in FIG. 8, until each of the number of stabs 36 is disposed adjacent a corresponding busbar 14 of the number of busbars. Once disposed in such position, take-off device 30 is then rotated approximately 90° with respect to the busway 10, in a direction as shown by arrow 66 of FIG. 8, so that housing 32 is thus positioned generally aligned with housing 12 of busway 10, such as shown in FIGS. 9A and 9B. During such rotation, each stab 36 is brought into contact with the corresponding busbar 14 of busway 10.

After housing 32 has been aligned with housing 12 of busway 10, lever member 44 is rotated from the first position (such as shown in FIG. 9A) about first axis 46 roughly one quarter of a turn until (in a counter-clockwise direction in the particular orientation shown in FIGS. 9A and 9B) until lever member 44 is disposed in the previously described second position in which lever member 44 is positioned generally parallel with the bottom (not numbered) of housing 12 of busway 10. As lever member 44 is moved from the first position (FIG. 9A) to the second position (FIG. 10A), the first arcuate member 48 (which is rigidly coupled to the lever member 44) likewise moves from the retracted position shown in FIGS. 9A and 9B, to the extended position shown in FIGS. 10A, 10B and 11 wherein a portion (not numbered) of the first arcuate member 48 engages a portion of the housing 12 of busway 10. As previously described, as the first arcuate member 48 moves from the retracted position to the extended position, so too does the second arcuate member 54 due to the interaction of the first and second toothed portions 50, 58, thus leaving the first and second arcuate members 48 and 54 positioned in an extended position such as shown in FIG. 10B. As the first and second arcuate members 48 and 54 move into such position as shown in FIG. 10B, any gap that may be present between housing 12 of busway 10 and housing 32 of take-off device 32 is generally removed as the two housings 12 and 32 are generally pulled tightly together by the interaction of the arcuate members 48 and 56 with the housing 12.

It is also to be appreciated that through such interaction of arcuate members 48 and 56 with the housing 12, securement mechanism 40 becomes part of the electrical grounding path to the housing of the busway 10 when locked into position.

Next, latch member 60 is rotated (counter-clockwise in the particular orientation shown in FIG. 9A) from a first position, such as shown in FIG. 9A, to a second position, such as shown in FIG. 10A, wherein the latch member 60 is positioned generally perpendicular to the lever member 44 and a portion of lever member 44 is disposed in seat portion 68. Once the components of the securement mechanism 40 are disposed in such positioning as shown in FIGS. 10A and 10B, the weight of the system will impose a positive torque (e.g., in the clockwise direction in the particular orientation shown in FIGS. 10A and 10B) on the level member 44, which is generally opposed by the latch member 60, thus creating a resistive load that effectively locks the securement mechanism 40, and thus the take-off device 30, into place on the electrical busway 10.

In order to remove take-off device 30 from busway, the housing 32 is generally pushed toward busway 10 so as to generally relieve the force from the weight of the device acting on the arcuate members 48 and 54, and thus lever member 44 (which is engaged by seat portion 68). Next the seat portion 68 of latch member 60 is disengaged from the lever member 44 by rotating latch member 60 (clockwise in the embodiment shown in FIG. 10A) about the third axis 62 from its second position (FIG. 10A) back to its first position (FIG. 9A). Once the latch member 60 has been disengaged from the lever member 44, the lever member 44 is then rotated (clockwise in the embodiment shown in FIG. 10A) about the first axis 46 from its second position (FIG. 10A) back to its first position (FIG. 9A). Upon such movement of the lever member 44, each of the arcuate members 48 and 54 also move from their second positions in which they are engaged with the housing 12 of busway 10 (such as shown in FIGS. 10A and 10B) to their first positions in which they are generally retracted into housing 32 of take-off device 30 (such as shown in FIGS. 9A and 9B). Once the arcuate members 48 and 54 have been retracted, housing 32 of the take-off device 30 is then rotated with respect to the busway 10 until disposed generally perpendicular to the busway 10. When positioned generally perpendicular to the busway 10, the take-off device 30 may then be removed from the busway 10.

From the foregoing description, it is to be readily appreciated that embodiments of the present concept provide several benefits over conventional arrangements. Such benefits include, for example, without limitation, that the present concept: improves take-off device installation safety and ease-of-access for the installer, reduces quantity of removable components per take-off device, eliminates the need for installation tools for take-off device installation, significantly shortens the installation time required per take-off device, reduces the length of busway consumed by each take-off device, allows for take-off devices to be installed closer together, and provides a more aesthetically pleasing design by eliminating bulky hardware for a more streamlined appearance.

In example embodiments of the present concept, lever member 44 and arcuate members 48 and 54 have been formed from powdered metals, although other suitable materials (e.g., without limitation, aluminum, steel, zinc, etc.) may be employed without varying from the scope of the present concept.

It is to be appreciated that the electrical busway 10 illustrated herein is provided for exemplary purposes only and is not intended to be limiting upon the scope of the present concept.

While specific embodiments of the present concept have been described in detail, it will be appreciated by those skilled in the art that various modifications and alternatives to those details could be developed in light of the overall teachings of the disclosure. For example, without limitation, the general concepts described herein could be applied to take-off devices for busways having different quantities of busbars or busbars arranged in a different manner than those described herein without varying from the scope of the present concept. Accordingly, the particular arrangements disclosed herein are meant to be illustrative only and not limiting as to scope of the present invention which is to be given the full breadth of the claims appended and any and all equivalents thereof.

What is claimed is:

1. A take-off device comprising:
   a housing having a number of electrical components disposed therein;
   a number of stabs electrically coupled to the electrical components, each stab of the number of stabs being structured to engage a busbar of an electrical busway; and
   a securement mechanism moveably coupled to the housing and structured to tightly secure the take-off device to the electrical busway without the use of any tools,
   wherein, when the take-off device is engaged with the electrical busway, the securement mechanism is moveable laterally, but not longitudinally, with respect to the electrical busway when being moved to secure the take-off device to the electrical busway.

2. The take-off device of claim 1 wherein the securement mechanism is moveable from a first position to a second position, and wherein when disposed in the second position is structured to secure the take-off device to an electrical busway.

3. The take-off device of claim 1, wherein the number of stabs are disposed at or about a first end of the housing and wherein the securement mechanism is disposed at or about an opposite second end of the housing.

4. The take-off device of claim 1, wherein the securement mechanism comprises:
   a first member moveably coupled to the housing and structured to selectively engage a portion of an electrical busway.

5. The take-off device of claim 4, wherein the first member comprises a lever member disposed on an outer portion of the housing and rotatably coupled thereto such that the lever member is rotatable with respect to the housing about a first axis.

6. The take-off device of claim 5, wherein the first member further includes a first arcuate member disposed on an inner portion of the housing which is rigidly coupled to the lever member in a manner such that the first arcuate member is rotatable with respect to the housing along with the lever member about the first axis.

7. The take-off device of claim 6, wherein the first arcuate member includes a toothed portion disposed facing outward from the first axis.

8. The take-off device of claim 7, wherein the lever member and the first arcuate member are aligned such that when the lever member is disposed in a generally vertical position extending downward from the first axis, the first arcuate member is generally retracted into the housing.

9. The take-off device of claim 4, wherein the securement mechanism further comprises a second member moveably coupled to the housing and structured to selectively engage another portion of the electrical busway.

10. The take-off device of claim 9, wherein the second member comprises a second arcuate member disposed on an inner portion of the housing and which is rotatable with respect to the housing about a second axis which is disposed generally parallel to the first axis.

11. The take-off device of claim 8, wherein the securement mechanism further comprises a second arcuate member disposed on an inner portion of the housing and which is rotatable with respect to the housing about a second axis which is disposed generally parallel to the first axis, wherein the second arcuate member includes a second toothed portion disposed facing outward from the second axis, and wherein each of the first and second arcuate members are sized and positioned such that the first toothed portion and the second toothed portion cooperatively mesh such that rotation of the first arcuate member about the first axis in a first direction causes the second arcuate member to rotate about the second axis in a second direction opposite the first direction.

12. The take-off device of claim 11, wherein the securement mechanism further includes a latch member rotatably coupled to the outside of housing such that latch member is rotatable about a third axis disposed generally parallel to the first axis and the second axis.

13. The take-off device of claim 12:
wherein the lever member is moveable from a first position to a second position;
wherein:
when the lever member is disposed in the first position each of the first arcuate member and the second arcuate member is disposed generally within the housing in a corresponding first position, and
wherein the lever member is disposed in the second position, each of the first arcuate member and the second arcuate member is disposed generally extended from the housing in a corresponding second position; and
wherein when the lever member is disposed in the second position, the latch member is moveable from a first position in which the latch mechanism is not engaged with the lever member to a second position in which the latch member is engaged with the lever member and generally prevents movement of the lever member from its second position.

14. A method for securing a take-off device to an electrical busway having a housing and a number of busbars disposed therein, the method comprising:
aligning a housing of the take-off device with the housing of the busway, the housing of the take-off device including a securement mechanism coupled thereto; and
moving the securement mechanism laterally, but not longitudinally, with respect to the housing of the busway from a first position in which the securement mechanism is not engaged with the housing of the busway to a second position in which the securement mechanism is engaged with, and securely couples the housing of the take-off device to the housing of the busway.

15. The method of claim 14 further comprising moving a latch member associated with the securement mechanism from a first position to a second position in which the latch member effectively locks the securement mechanism in the second position.

16. The method of claim 14 wherein aligning the housing of the take-off device with the housing of the busway comprises:
engaging a portion of the take-off device with the housing of the busway; and
rotating the take-off device with respect to the housing of the busway.

17. A take-off device comprising:
a housing having a number of electrical components disposed therein;
a number of stabs electrically coupled to the electrical components, each stab of the number of stabs being structured to engage a busbar of an electrical busway a longitudinal axis; and
a securement mechanism moveably coupled to the housing and structured to tightly secure the take-off device to the electrical busway without the use of any tools,
wherein the securement mechanism comprises a first member moveably coupled to the housing and structured to selectively engage a portion of an electrical busway,
wherein the first member comprises a lever member disposed on an outer portion of the housing and rotatably coupled thereto such that the lever member is rotatable with respect to the housing about a first axis,
wherein the first member further includes a first arcuate member disposed on an inner portion of the housing which is rigidly coupled to the lever member in a manner such that the first arcuate member is rotatable with respect to the housing along with the lever member about the first axis, and
wherein the first arcuate member includes a toothed portion disposed facing outward from the first axis.

18. The take-off device of claim 17, wherein the lever member and the first arcuate member are aligned such that when the lever member is disposed in a generally vertical position extending downward from the first axis, the first arcuate member is generally retracted into the housing.

19. The take-off device of claim 18, wherein the securement mechanism further comprises a second arcuate member disposed on an inner portion of the housing and which is rotatable with respect to the housing about a second axis which is disposed generally parallel to the first axis, wherein the second arcuate member includes a second toothed portion disposed facing outward from the second axis, and wherein each of the first and second arcuate members are sized and positioned such that the first toothed portion and the second toothed portion cooperatively mesh such that rotation of the first arcuate member about the first axis in a first direction causes the second arcuate member to rotate about the second axis in a second direction opposite the first direction.

20. The take-off device of claim 19, wherein the securement mechanism further includes a latch member rotatably coupled to the outside of housing such that latch member is rotatable about a third axis disposed generally parallel to the first axis and the second axis.

* * * * *